Patented June 2, 1931

1,808,604

UNITED STATES PATENT OFFICE

WALTER A. KUENZLI, OF EVANSVILLE, INDIANA, ASSIGNOR TO SERVEL INC., OF NEW YORK, N. Y., A CORPORATION OF DELAWARE

REFRIGERANT COMPOSITION

No Drawing. Application filed June 18, 1930. Serial No. 462,152.

This invention relates to the art of refrigeration and more particularly to the provision of a warning agent adapted to be used in conjunction with well known refrigerants, of which methyl chloride is illustrative, in a closed refrigerating system, which warning agent will indicate the escape of refrigerant from a system and will be readily detected by persons in the vicinity and afford them sufficient time to vacate the premises before the air is sufficiently filled with the poisonous gases and harmful quantities of the fumes are inhaled.

It is an object of the invention to provide a warning agent which will minimize the hazard contingent upon the use of certain toxic and inflammable refrigerants, such warning agent being of such a character that an unmistakable warning will be given before the atmosphere is filled with harmful quantities of poisonous gases, and the warning effect will gradually increase with length of time of exposure until such time as the human system is practically powerless to resist heeding the same.

Further objects of the invention are to provide a comparatively inexpensive and easily manufactured yet powerful warning agent soluble in methyl chloride and having distinctive properties, which will not produce more than a temporary disturbance on the human system, which may be easily dissipated by airing out a room in which it is contained, will not appreciably alter the physical properties of the refrigerant or cause corrosion of the system in which it is contained and which will be constantly contained in all parts of the system irrespective of temperature.

The above objects are accomplished by the provision of a pungent warning agent which may be readily detected by the human senses on account of its powerful penetrating and offensive characteristic and by means of which it may be easily detected on account of its distinctive nature. The pungent warning agent is one that will produce noticeable effect upon eye, nose or throat, in advance of harmful exposure.

The warning agent that I have discovered in order to prevent persons from being overcome from noxious and inflammable refrigerating gases contained in single and multiple installations of closed mechanical refrigerating systems in a colorless liquid acrolein, allyl aldehyde or acrylaldehyde $CH_2 \cdot CH \cdot CHO$, which is preferably mixed in small quantities of from .05% up to 5.00% with methyl chloride or other well known refrigerant. A refrigerant of this character containing such minute quantity of this warning agent will produce grave discomfort to a person inhaling the same without harmful effect upon such person. This discomfort is caused by the irritating and lachrymating effect produced upon the eyes, nose and throat, a copious flow of tears being first produced and subsequently the continued breathing of the vapor is rendered practically impossible.

In lieu of acrolein other of the pungent organic chemicals known as aldehydes may be added to odorless colorless refrigerants with substantially the same results. The properties of the refrigerant are substantially unaltered by the addition of the warning agent above mentioned and it is found that this warning agent enters readily into the solution of the refrigerant and at the same time does not have a corrosive effect on metals in the presence of moisture.

I claim:

1. A refrigerant comprising a relatively large proportion of methyl chloride and a relatively small proportion of acrolein.

2. A refrigerant comprising a volatile chloride and acrolein.

3. A refrigerant comprising methyl chloride and acrolein.

4. A refrigerant comprising a volatile chloride and acrolein in concentrations between 0.05 and 5.00 percent.

5. A refrigerant comprising methyl chloride and acrolein in concentrations between 0.05 and 5.00 percent.

6. A refrigerant comprising methyl-chloride and 1% acrolein as a warning agent.

7. A refrigerant comprising a volatile chloride having acrolein in detectable quantities therein.

8. With a fluid refrigerant adapted to be contained in a closed refrigerating system, acrolein introduced into the refrigerant in detectable quantities as a warning agent.

9. A refrigerant of the liquid gas phase type containing acrolein.

In testimony whereof I affix my signature.

WALTER A. KUENZLI.